United States Patent
Nilsson et al.

(10) Patent No.: US 9,665,973 B2
(45) Date of Patent: May 30, 2017

(54) DEPTH BUFFERING

(71) Applicant: Intel Corporation, Santa Clara, CA (US)

(72) Inventors: Jim K. Nilsson, Lund (SE); Tomas G. Akenine-Moller, Lund (SE)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 13/681,614

(22) Filed: Nov. 20, 2012

(65) Prior Publication Data

US 2014/0139524 A1 May 22, 2014

(51) Int. Cl.
*G06T 15/40* (2011.01)
*G06T 1/60* (2006.01)

(52) U.S. Cl.
CPC .............. *G06T 15/405* (2013.01); *G06T 1/60* (2013.01)

(58) Field of Classification Search
CPC ..... G06T 15/405; G06T 15/40; G06T 15/005; G06T 15/503; G09G 5/393
See application file for complete search history.

(56) References Cited

U.S. PATENT DOCUMENTS

| | | | |
|---|---|---|---|
| 5,844,571 A * | 12/1998 | Narayanaswami | 345/422 |
| 6,498,605 B2 | 12/2002 | Abdallah | |
| 6,677,945 B2 | 1/2004 | Lapidous | |
| 7,414,625 B1 * | 8/2008 | Rodriguez et al. | 345/426 |
| 8,471,851 B2 | 6/2013 | Strom | |
| 2002/0180731 A1 | 12/2002 | Lapidous | |
| 2003/0056080 A1 * | 3/2003 | Watanabe | 711/219 |
| 2003/0080965 A1 * | 5/2003 | Ashburn | G06F 13/28 345/545 |
| 2005/0229181 A1 * | 10/2005 | Vazeille et al. | 718/102 |
| 2009/0150654 A1 * | 6/2009 | Oberman | G06F 9/30014 712/221 |
| 2009/0153557 A1 | 6/2009 | Dimitrov | |
| 2011/0239090 A1 * | 9/2011 | Iwatsuki | G11C 29/56 714/763 |
| 2011/0252288 A1 * | 10/2011 | Sharon et al. | 714/758 |
| 2011/0285746 A1 * | 11/2011 | Swic | 345/597 |
| 2013/0004072 A1 * | 1/2013 | Liu et al. | 382/173 |
| 2013/0282953 A1 * | 10/2013 | Orme et al. | 711/102 |

FOREIGN PATENT DOCUMENTS

WO  2012149084  11/2012

OTHER PUBLICATIONS

Akenine-Moller, T., et al., "Graphics for the Masses: A Hardware Rasterization Architecture for Mobile Phones," ACM Transactions on Graphics, vol. 22, No. 3, pp. 801-808, 2003.

(Continued)

*Primary Examiner* — Michelle Chin
(74) *Attorney, Agent, or Firm* — Trop Pruner & Hu, P.C.

(57) ABSTRACT

In accordance with some embodiments, depth values may be split into more and less significant bits. By so doing, some processing can be done based only on the more significant bits. Where the number of more significant bits is significantly less than the total number of bits, some memory bandwidth can be preserved. In other words, by only using the more significant bits for some of the depth buffering operations, memory bandwidth usage can be reduced, improving efficiency.

15 Claims, 3 Drawing Sheets

(56) References Cited

OTHER PUBLICATIONS

Greene, N., et al., "Hierarchical Z-Buffer Visibility," Proceedings of SIGGRAPH 1993, p. 231-238, 1993.
Hasselgren, J., et al., "Efficient Depth Buffer Compression," Graphics Hardware, p. 103-110, 2006.
PCT International Search Report and Written Opinion issued in corresponding PCT/US2013/048058 dated Nov. 12, 2013, (10 pages).
PCT Corrected Search Report in corresponding PCT/2013/048058 dated May 26, 2015 (6 pages).
TW Office action in corresponding TW 102141238 dated Jun. 18, 2015 (6 pages) [no translation].
TW search report in corresponding TW 102141238 dated Jun. 12, 2015 (2 pages).

* cited by examiner

DEPTH BUFFERING

BACKGROUND

This relates generally to the field of depth buffering and, in particular, embodiments relating to techniques for improved depth buffering for graphics rendering in the creation of three dimensional graphics.

Computer graphic systems are used to model a scene having three dimensional objects and then to display them on two dimensional display devices. One such system in common use is a polygon-based, object-ordered graphics system in which three dimensional objects in a scene are each represented by a multitude of polygons that approximate the shapes of objects depicted in the image. Depending upon the orientation selected for viewing the scene in two dimensions, many of the primitives representing objects in a scene will be hidden behind other primitives and not displayed. Primitives not completely hidden are termed visible and will be displayed, either in full or in part, depending upon whether a portion of a given primitive is hidden in the rendered image of the display device. As the depth complexity of a scene to be rendered increases, the percentage of all primitives representing the scene that ultimately are visible by an observer of the display device decreases significantly. Thus, in many cases, many of the primitives for a scene will be hidden.

BRIEF DESCRIPTION OF THE DRAWINGS

Some embodiments are described with respect to the following figures.

DETAILED DESCRIPTION

Figure 1:
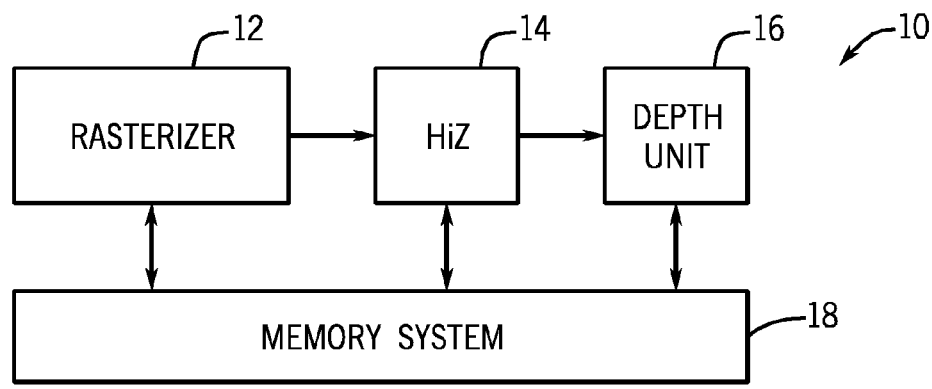
FIG. 1 is a system depiction for one embodiment of the present invention.

Conventional computer graphic systems may have a frame buffer and a depth buffer. The frame buffer is typically a memory that holds the digital representation of the color and the intensity for each pixel or sample in the image. The frame buffer is also referred to as the video bit map. The depth buffer, also referred to as a Z-buffer, is a large array of memory with an entry for each pixel or sample in the frame buffer.

One method for determining which primitives will be visible or hidden involves the use of a depth buffer. The depth axis in a graphics system reflects the distance from a specific observer's viewpoint. Thus, a larger depth value represents a greater distance from the viewpoint. Depth buffering involves a comparison of the depth values of points on a generated object to determine which object is closest to the viewpoint and, therefore, should appear on a two dimensional display. As part of the processing of the graphics data for a scene, pixels are generated for each of the primitives in the scene.

In conventional depth buffering, as each pixel is generated, its depth coordinate is compared with the depth coordinate previously stored in the depth buffer for that position in the image. Before processing the first primitive for the scene, the depth buffer is initialized by storing the value corresponding to the maximum distance in the depth buffer entry for every pixel so that the initial, old depth value corresponds to the maximum distance. In general, if the new depth value is less than the old depth value, indicating that the pixel is closer to the viewpoint than the previous viewpoint, then that pixel is written to the display device and the depth buffer is updated to contain the new value. If the new value is greater than or equal to the old value, then the pixel is not written and the depth buffer remains unchanged. Note that the text above describes a depth test called "less than", i.e., the depth buffer keeps the values that are less than the previous values. Other depth tests can be used as well. All of the pixels for a primitive that are completely hidden ultimately may be overwritten in the depth buffer during the process so that the primitive is not displayed.

In computer graphics, "rendering" is the process of translating a set of data into a picture that can be displayed. In the rendering process, a picture database typically holds polygon data that is read and calculations are performed by rendering hardware, pixel-by-pixel, to decide the color of each pixel. A color calculator often performs this functionality. When a polygon is rendered, a color sample is obtained for each pixel that the polygon covers. If oversampling is carried out, each pixel has multiple corresponding color values that are averaged to give a final color. Each color has an associated depth value and location. For example, in a less than depth test, the depth buffer stores the smallest depth value and counter for each location. If a color sample has a depth value smaller than the value for that location as recorded in the depth buffer, that sample is written to the frame buffer and the depth buffer is updated. Otherwise, the color sample is discarded.

Thus, in depth buffering, the color determination of each pixel, as well as many other functions associated with three dimensional graphics, such as using different textures that include different shadings, holes, transparent textures, translucent textures, and other features, is typically performed in a rendering engine of a graphics processor. The rendering engine performs these functions by utilizing a rendering pipeline. Graphics data flows along the rendering pipeline. Typically, depth buffering is not performed until the end of the pipeline. The idea of depth buffering is to remove pixels for primitives that would be occluded. As a result, processing time can be saved and efficiency may be improved.

In accordance with some embodiments, depth values may be split into more and less significant bits. By so doing, some processing can be done based only on the more significant bits. Where the number of more significant bits is significantly less than the total number of bits, some memory bandwidth can be preserved. In other words, by only using the more significant bits for some of the depth buffering operations, memory bandwidth usage can be reduced, improving efficiency.

In some cases, the memory bandwidth utilization is the most important determinant of power consumption. In many applications, including mobile applications, power consumption is a prime consideration.

A memory access is one of the most power consuming operations in a computer system. Therefore, it is important to reduce memory bandwidth usage to the greatest possible extent.

By reducing memory bandwidth usage to and from the depth buffer in a graphics processor, significant power consumption savings may be obtained in some cases. Thus, in some embodiments, by reducing the number of bits used to represent depth values, memory bandwidth may be reduced, while also reducing power consumption. The techniques described herein may be used in conjunction with normal depth buffering techniques, including depth buffer caching, depth buffer compression, Zmax culling, and Zmin culling.

In many graphics processing specifications including DirectX and OpenGL, a depth value may be stored in 24 bit integer or 32 bit floating point values. The inventors of the present application have discovered that there is relatively little useful content in the least significant bits of the depth values. Thus, a depth value Z may have N bits, which typically is 24 or 32 bits at the present time. The H most significant bits can be denoted by the nomenclature $Z^{hi}$ and the L least significant bits can be denoted by the $Z^{lo}$. Hence, $Z=(Z^{hi}<<L)+Z^{lo}$. It holds that $(Z^{hi}<<L)+000\ldots00b<=Z<=(Z^{hi}<<L)+111\ldots11b$, where $000\ldots00b$ means L binary zeroes, and $111\ldots11b$ means L binary ones. For simplicity, $Z^f=(Z^{hi}<<L)+000\ldots00b$ which is Z quantized to H bits, with floor rounding) and $Z^c=(Z^{hi}<<L)+111\ldots11b$ which is Z quantized to H bits, with a ceil rounding).

Generally, with Zmin/Zmax culling, a graphics processor reads the current depth values, followed by a depth comparison per sample or pixel and, if the depth comparison passes, the new depth value is written to the depth buffer via the depth cache. In accordance with some embodiments of the present invention, the depth comparison may be conducted conservatively so as to never generate any incorrect depth comparisons using only $Z^{hi}$ in the first instance and then continuing by using $Z^{lo}$, only when it is needed.

In embodiments described herein, the depth test is a less than test in that the depth test passes if the incoming sample's depth is less than the corresponding depth in the depth buffer. However, any depth test can be used in other embodiments of the present invention.

Referring to FIG. 1, a depth pipeline may include a rasterizer 12 coupled to a memory system 18, a HiZ unit 14 and a depth unit 16. The HiZ unit 14 performs, in one embodiment, Zmin/Zmax culling. The amount of data that passes between the depth unit 16 and the memory unit 18 determines the bandwidth that is needed and, ultimately, controls part of the power consumption of the unit. Thus, in some embodiments of the present invention, it is desired to reduce the bandwidth of memory transfers between the depth unit and the memory system. These memory transfers are generally in terms of memory reads or memory writes.

Thus, if only the H bits of a depth value are read by the depth unit 16 from the memory system, by reading $Z^{hi}$, bandwidth could be reduced. Namely, by performing a conservative depth test using the $Z^{hi}$ value, less bits must be transferred between the depth unit and the memory system 18. The following outcomes are possible when this is done where $Z_i$ is the incoming depth and $Z_d$ is the depth coming from the depth buffer inside the depth unit 16. If $Z_i$ is less than $Z_d^f$, then the incoming depth $Z_i$ is guaranteed to be in front of the depth value already in the depth buffer. In this case, significant savings may be achieved since only H bits, instead of the entire N bits, were used. To update the depth buffer, both $Z_i^{hi}$ and $Z_i^{lo}$ may be written to the depth buffer. While the write may not save bandwidth, the read operation involves less bandwidth and so is bandwidth conservative.

Another possibility is $Z_i$ is greater than $Z_d^c$, which means that the test failed because the incoming depth is guaranteed to be behind or occluded by the current content of the depth buffer. Again, since only H bits were read to find the answer, instead of N bits, bandwidth was saved.

In other cases, the result is ambiguous and the use of only the high set of bits is not conclusive. But, still, in many cases, bandwidth is be conserved. Where the result is ambiguous, the less significant bits must also be read in order to resolve the depth test. Then the depth test is again performed on the less significant bits and, if the depth test fails, no memory updates are needed. However, if the depth test passes, then $Z_i^{lo}$ must be written to a cache. However, there is no need to write $Z_i^{hi}$ since it is already known to be correct as stored in the buffer.

Based on experiments, it has been determined that, in some embodiments, the optimal value for H for read bandwidth is 8 bits and the optimal write bandwidth for H is 9 bits. Thus, in some embodiments, H=8 may be chosen as the most reasonable choice, since this fits well with most memory layouts.

The $Z^{hi}$ bits for a small rectangular region of pixels, such as a tile, in many cases will only contain a few sets of unique H-bit values. In one embodiment, $2^k$ values of H bits each may be used. Then every sample/pixel needs a k-bit index to point to one of these $2^k$ values. In many cases, k=2 triggers compression in the majority of cases and provides generous compression. For example, for 8×8 pixel tiles, the most significant bits may be 8*8*8=512 bits of storage, while, with the approach described herein, only 160 bits of storage would be needed (4*8+8*8*2). Different variations of k are also conceivable. The compressed most significant bits may be stored together with the Zmin and the Zmax values in a fast, small memory, in some embodiments.

For the $Z^{lo}$ bits of a tile, compression may be used. For example, the depth offset compression technique may be used. See Jon Hasselgren and Tomas Akenine-Möller, "Efficient Depth Buffer Compression," Graphics Hardware, pages 103-110, 2006.

Figure 2:
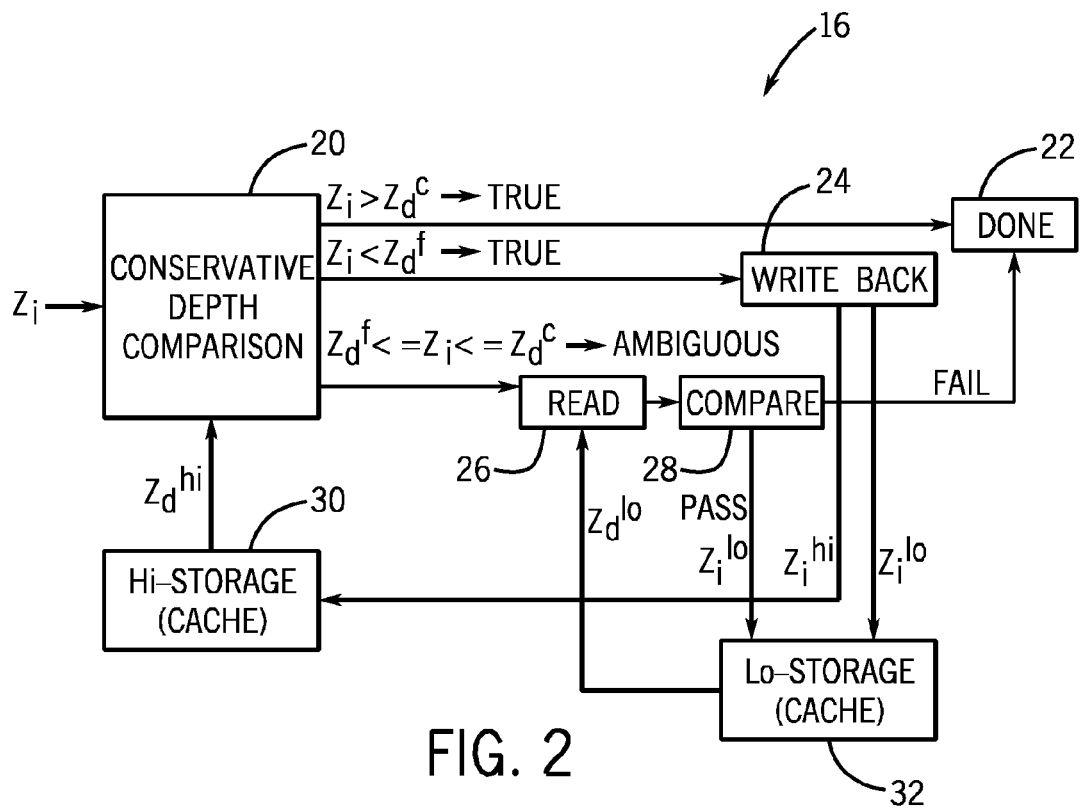
FIG. 2 is a more detailed schematic depiction of the depth buffer shown in FIG. 1 in accordance with one embodiment.

Turning now to FIG. 2, it may represent a software, firmware, and/or hardware embodiment. In software and firmware embodiments, it may be implemented by computer executed instructions stored in one or more non-transitory computer readable media, such as magnetic, optical, or semiconductor storage.

In one embodiment, two separate caches 30 and 32 (or two separate portions of the same memory) may be used for storage of the H bits and the L bits. In some embodiments, these caches may be located in a shared cache and they may share a second level cache as well.

The incoming depth values $Z_i$ come to a conservative depth comparison module 20. It performs the three tests already described. If $Z_i$ is greater than $Z_d^c$ then the result is achieved and the flow may end, as indicated at 22. If $Z_i$ is less than $Z_d^f$ is true, then the values for the high and low depth values should be written both to the low storage cache 32 and the high storage cache 30. If the conservative depth comparison is indeterminate, the less significant values must be read from the low storage 32 and then compared together with the high or more significant values in the comparison module 28. If the comparison passes, then the low values must replace the currently stored values in the low storage cache 32. Otherwise, a fail indication is done and the flow ends.

Figure 3:
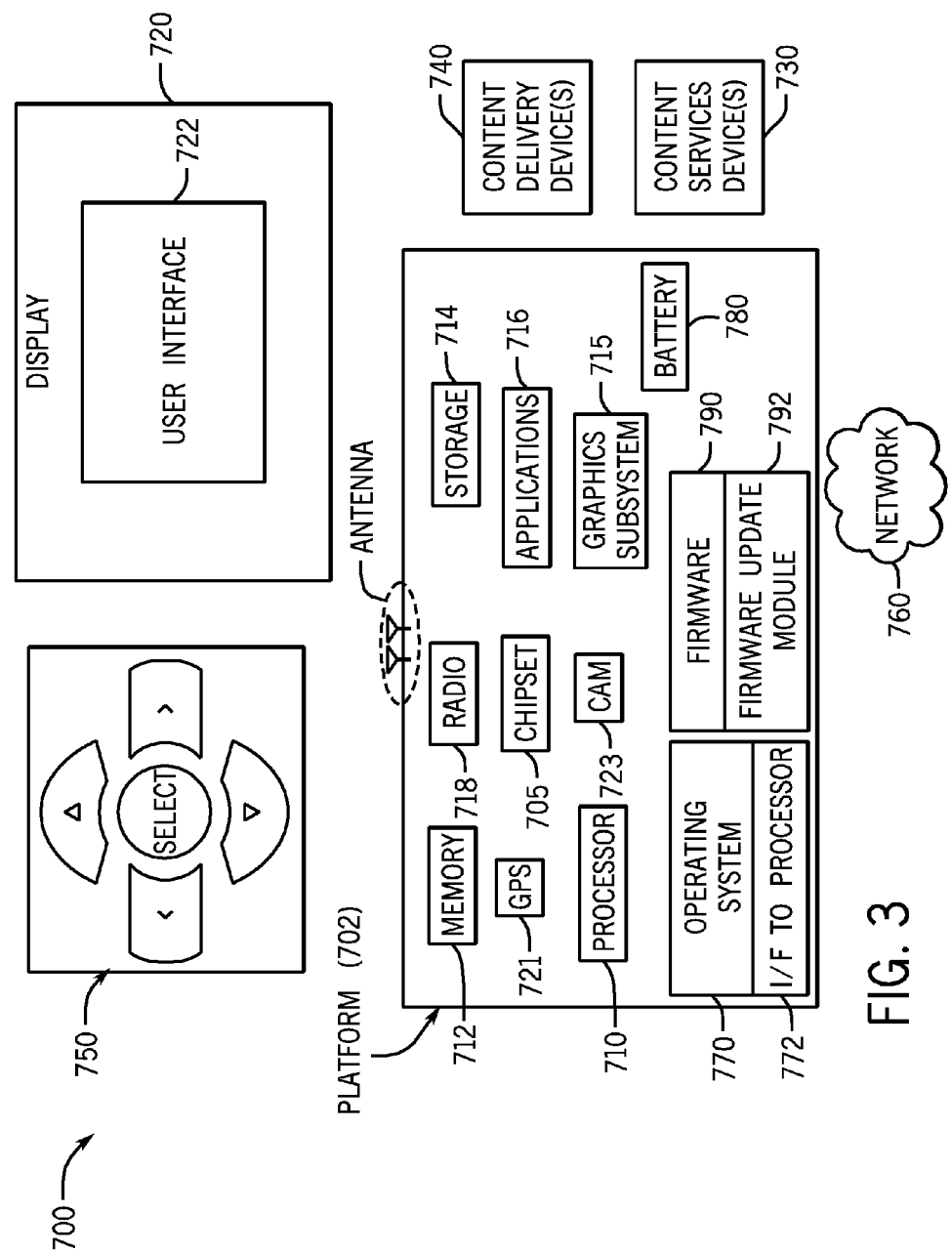
FIG. 3 is a system depiction for one embodiment of the present invention.

FIG. 3 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequence shown in FIG. 2 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 3.

Figure 4:
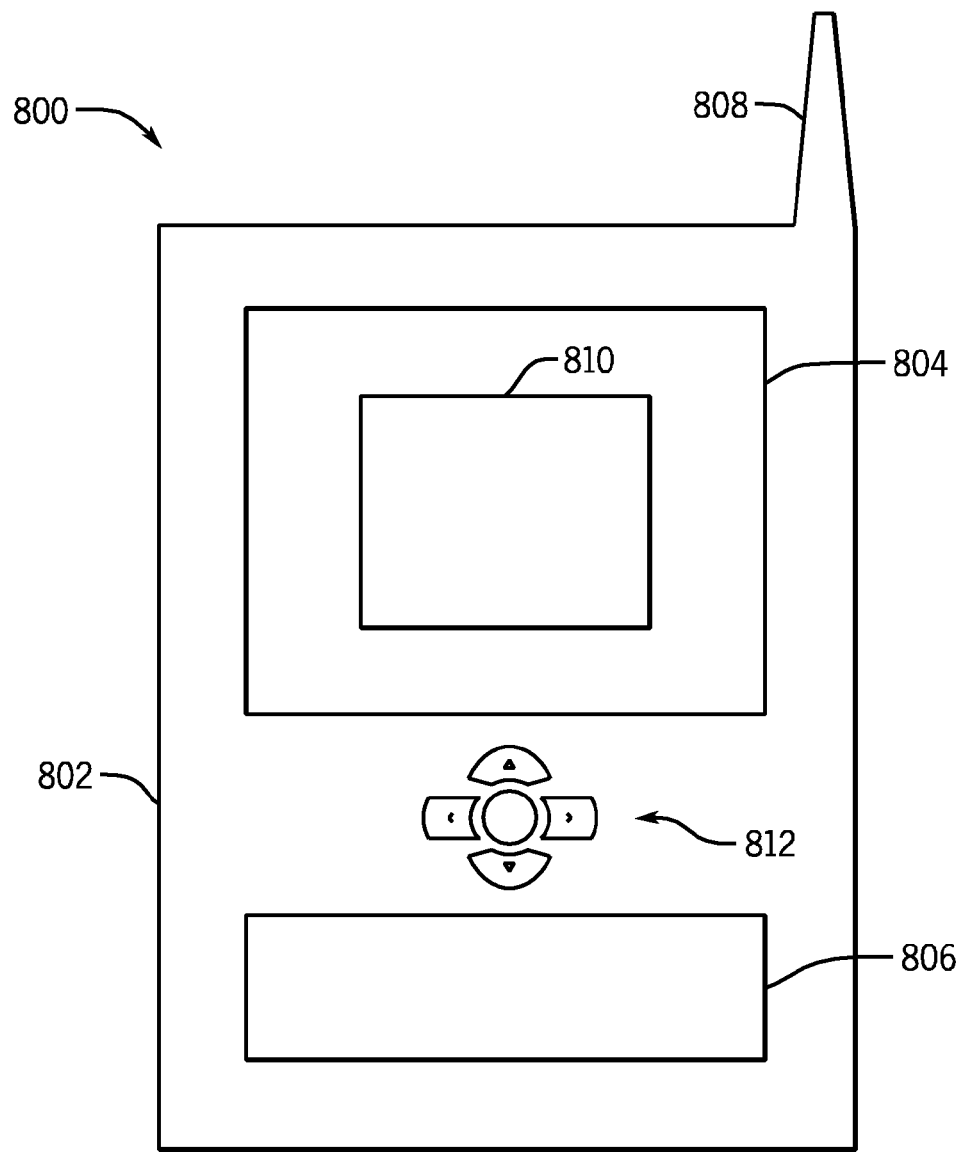
FIG. 4 is a front elevational view of one embodiment.

As described above, system 700 may be embodied in varying physical styles or form factors. FIG. 4 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 5, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
splitting bits making up a depth value in a graphics processing unit into more and less significant bits;
initially doing a depth buffering analysis only using the more significant bits by determining whether the more significant bits of an incoming depth value are less than the more significant bits of a stored depth value stored;
determining if an incoming depth value is less than a depth from the depth buffer quantized to a number of bits equal to the most significant bits and in which case, updating the depth buffer and if the incoming depth is greater than the depth in the depth buffer, quantized to the number of most significant bits, determining that the depth test fails because the incoming depth is guaranteed to be occluded by the content of the depth buffer, and if the depth from the depth buffer is equal to the input depth value or the incoming depth value is less than or equal to the depth value, then using the least significant bits to resolve the depth test; and
wherein using the least significant bits includes, if a depth test using least significant bits passes, writing only the least significant bits.

2. The method of claim 1 including only using the less significant bits if the depth analysis with the more significant bits is indeterminant.

3. The method of claim 1 including performing a less than depth test.

4. The method of claim 1 including using eight bits of the depth value as the more significant bits.

5. One or more non-transitory computer readable media storing instructions executed by a processor to perform a sequence comprising:
splitting bits making up a depth value in a graphics processing unit into more and less significant bits;
initially doing a depth buffering analysis only using the more significant bits by determining whether the more significant bits of an incoming depth value are less than the more significant bits of a stored depth value stored;
determining if an incoming depth value is less than a depth from the depth buffer quantized to a number of bits equal to the most significant bits and in which case, updating the depth buffer and if the incoming depth is greater than the depth in the depth buffer, quantized to the number of most significant bits, determining that the depth test fails because the incoming depth is guaranteed to be occluded by the content of the depth buffer, and if the depth from the depth buffer is equal to the input depth value or the incoming depth value is less than or equal to the depth value, then using the least significant bits to resolve the depth test; and
wherein using the least significant bits includes, if a depth test using least significant bits passes, writing only the least significant bits.

6. The media of claim 5 further storing instructions to perform the sequence including only using the less significant bits if the depth analysis with the more significant bits is indeterminant.

7. The media of claim 5 further storing instructions to perform the sequence including performing a less than depth test.

8. The media of claim 5 further storing instructions to perform the sequence including using eight bits of the depth value as the more significant bits.

9. A graphics processing unit comprising:
a core to split depth value bits into a first group of more significant bits and a second group of less significant bits, then to analyze depth buffering using only the first group by determining whether the more significant bits of an incoming depth value are less than the more significant bits of a stored depth value stored, determine if an incoming depth value is less than a depth from the depth buffer quantized to a number of bits equal to the most significant bits and in which case, update the depth buffer and if the incoming depth is greater than the depth in the depth buffer, quantized to the number of most significant bits, determine that the depth test fails because the incoming depth is guaranteed to be occluded by the content of the depth buffer, and if the depth from the depth buffer is equal to the input depth value or the incoming depth value is less than or equal to the depth value, then use the least significant bits to resolve the depth test, and wherein using the least significant bits includes, if a depth test using least significant bits passes, writing only the least significant bits; and a memory coupled to said core.

10. The unit of claim 9 said core to use the less significant bits of the depth analysis with the more significant bits is indeterminant.

11. The unit of claim 9 said core to use eight bits of the depth value as the more significant bits.

12. The unit of claim 9 said core to perform a less than depth test.

13. The unit of claim 9 including an operating system.

14. The unit of claim 9 including a battery.

15. The unit of claim 9 including firmware and a module to update said firmware.

* * * * *